United States Patent [19]

Parvin

[11] Patent Number: 4,845,610
[45] Date of Patent: Jul. 4, 1989

[54] TARGET RECOGNITION USING STRING-TO-STRING MATCHING

[75] Inventor: Bahram A. Parvin, Fountain Valley, Calif.

[73] Assignee: Ford Aerospace & Communications Corporation, Newport Beach, Calif.

[21] Appl. No.: 25,745

[22] Filed: Mar. 13, 1987

Related U.S. Application Data

[62] Division of Ser. No. 630,615, Jun. 13, 1984, Pat. No. 4,698,751.

[51] Int. Cl.⁴ .......................... G06F 7/20; G06K 9/12
[52] U.S. Cl. ...................................... 364/200; 364/516; 364/518; 358/101; 382/16; 382/30; 382/50
[58] Field of Search ... 364/200 MS File, 900 MS File, 364/419, 518, 523, 516; 358/109, 101; 382/16, 30, 50, 7, 48

[56] References Cited

U.S. PATENT DOCUMENTS

| | | | |
|---|---|---|---|
| 4,218,673 | 8/1980 | Yoshida | 382/18 |
| 4,267,562 | 5/1981 | Raimondi | 358/109 |
| 4,433,438 | 2/1984 | Couturier | 382/41 |
| 4,471,459 | 9/1984 | Dickinson et al. | 364/900 |
| 4,490,811 | 12/1984 | Yianilos et al. | 364/900 |
| 4,491,962 | 1/1985 | Sakou et al. | 382/50 |
| 4,494,139 | 1/1985 | Shima et al. | 358/101 |
| 4,592,090 | 5/1986 | Curl et al. | 382/7 |
| 4,652,803 | 3/1987 | Kamejima et al. | 318/587 |

OTHER PUBLICATIONS

"Segmentation of Natural Scenes", Bhanu et al., 1987, pp. 487-496.

Primary Examiner—Gary V. Harkcom
Assistant Examiner—Randy W. Lacasse
Attorney, Agent, or Firm—Edward J. Radlo; Keith L. Zerschling

[57] ABSTRACT

A method for determining whether a perceived target is acceptably close to a model target. The perceived target is first segmented using a relaxation based procedure. Structural features from the perceived target are extracted by producing a compact one-dimensional description of the perceived target's boundary. Said structural features are classified by using string-to-string matching, wherein one of two symbolic strings is a representation of the compact one-dimensional description of the boundary of the perceived target, and the other of said two symbolic strings is a pre-stored representation of the model target. The string-to-string matching entails measuring the distance between the two strings based upon deletion, insertion, and substitution of symbols from one string to the other. Performing the string-to-string matching measures how closely local structural features of the perceived target resemble local structural features of the model target.

3 Claims, 9 Drawing Sheets

FIG. 1
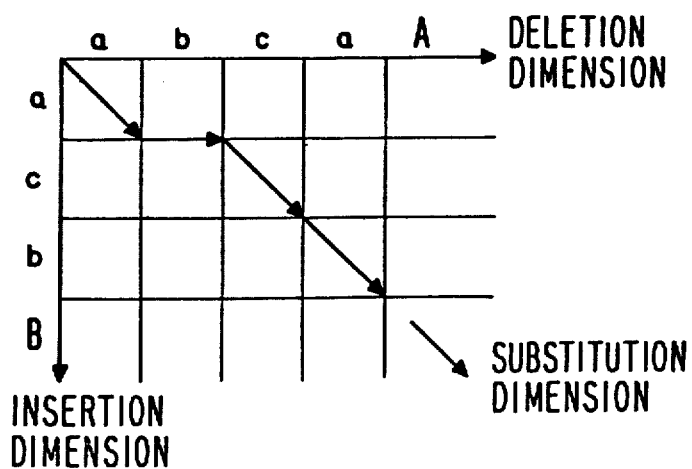
FIG. 2
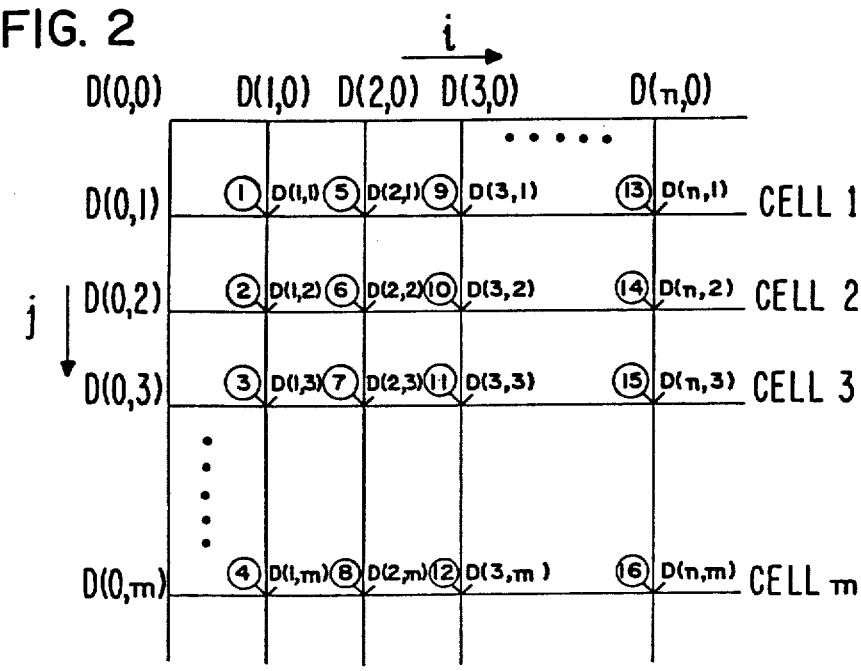
FIG. 3
| | t1 | t2 | t3 | t4 | t5 | t6 | t7 |
|---|---|---|---|---|---|---|---|
| CELL 1 | 1 | 5 | 9 | 13 | | | |
| CELL 2 | | 2 | 6 | 10 | 14 | | |
| CELL 3 | | | 3 | 7 | 11 | 15 | |
| CELL 4 | | | | 4 | 8 | 12 | 16 |

FIG. 6
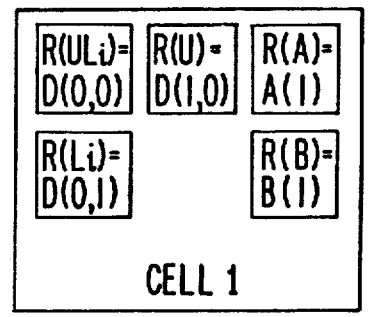
CELL 1
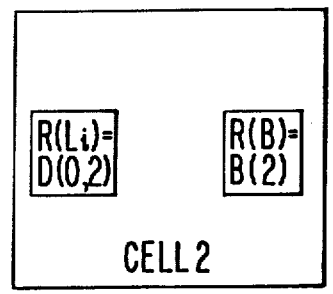
CELL 2
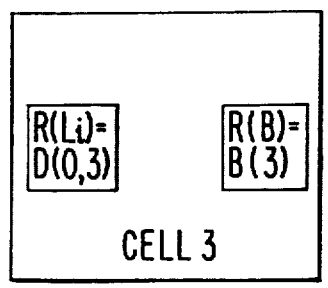
CELL 3
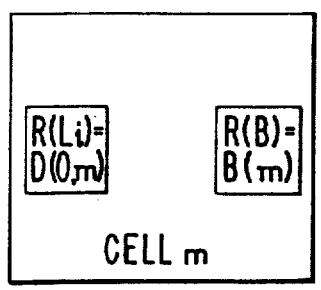
CELL m

FIG. 7
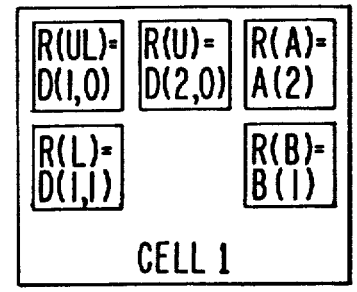
CELL 1
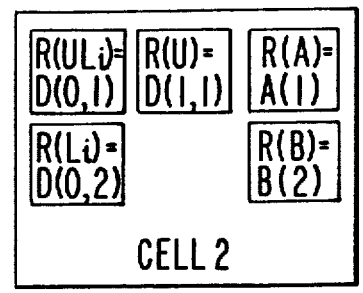
CELL 2
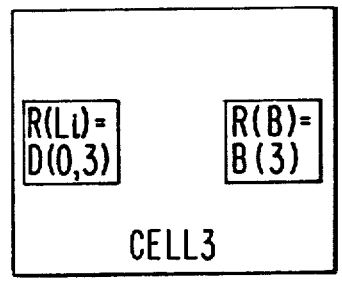
CELL3
.
.
.
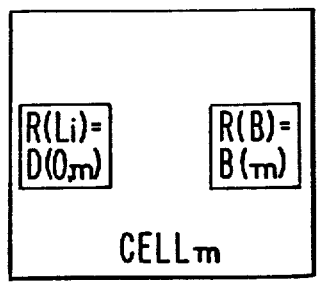
CELLm FIG. 8
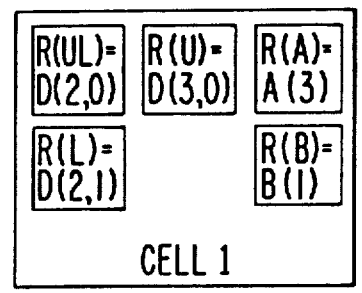
CELL 1
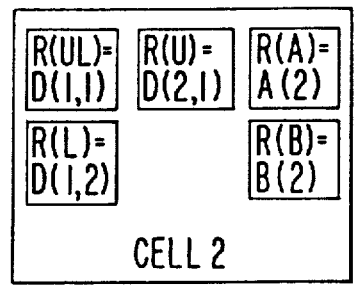
CELL 2
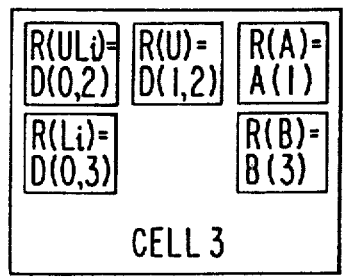
CELL 3
•
•
•
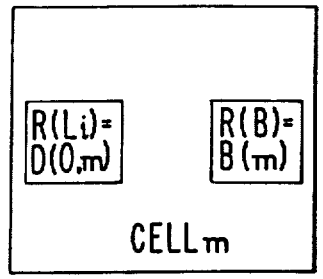
CELL m FIG. 9
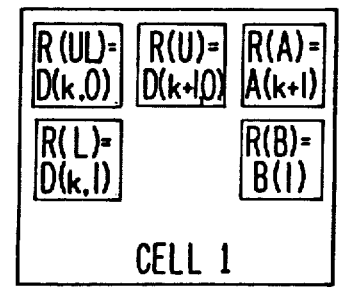
CELL 1
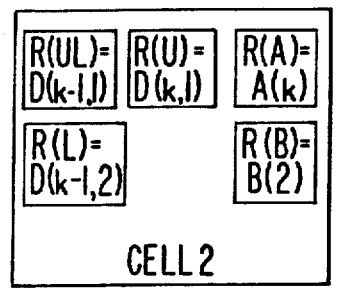
CELL 2
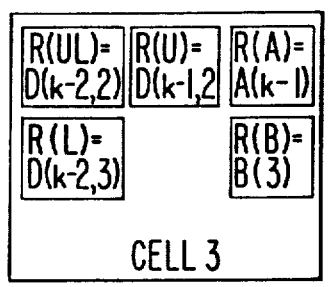
CELL 3
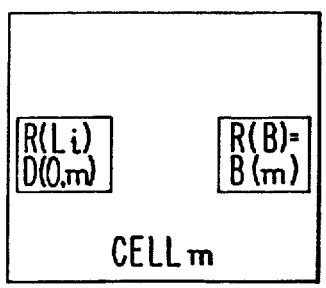
CELL m FIG.12
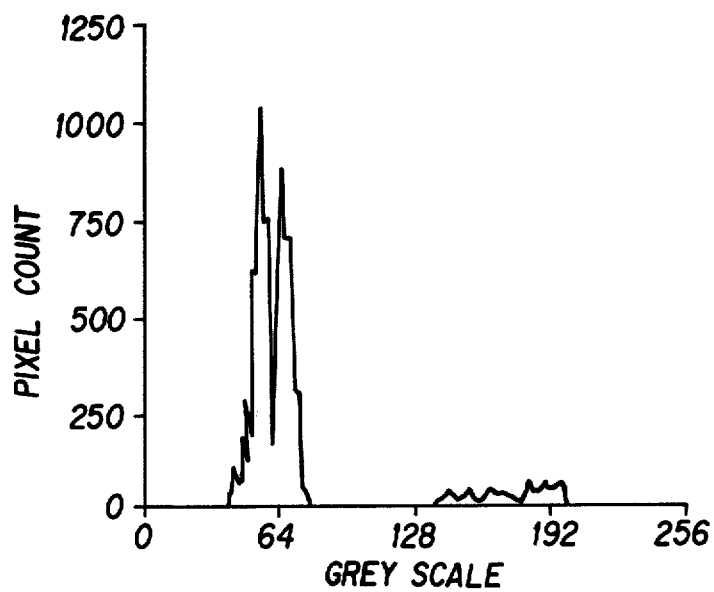
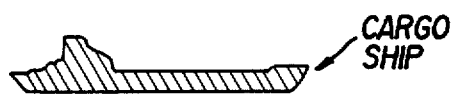
FIG.13a — CARGO SHIP
FIG.13b — CONTAINER SHIP
FIG.13c — LANDING ASSAULT TANKER
FIG.13d — FRIGATE
FIG.13e — DESTROYER

TARGET RECOGNITION USING STRING-TO-STRING MATCHING

This is a divisional application of application Ser. No. 630,615, now U.S. Pat. No. 4,698,751.

DESCRIPTION

1. Technical Field

This invention pertains to the fields of computer architecture and artifical intelligence.

2. Background Art

U.S. Pat. No. 4,286,330 discusses string-to-string matching, one of the main areas of applicability of the present invention. However, the cited patent uses linguistic means to perform the matching, i.e., a set of rewriting rules established for parsing strings. On the other hand, the present invention employs techniques of dynamic programming.

"Chip Compares Complex Strings" on pages 81 and 84 of *Electronic Engineering Times*, Dec. 19, 1983, is not prior art with respect to the present invention because the present invention was made before the publication date of this article. The article describes a computer chip that performs similarly to the present invention, but does not state that dynamic programming is employed as in the present invention, and does not state that the chips are cascadable as in the present invention.

Wagner, R. A, and Fischer, M. J., "The String-to-String Correction Problem", *Journal of the Association for Computing Machinery*, Vol. 21, No. 1, (Jan. 1974), pp. 168-173, describes an algorithm which uses dynamic programming to solve a string-to-string matching problem; this algorithm is one of the classes of cyclic loop dependency algorithms that can be advantageously solved by the present invention. The algorithm described in this reference is used as an example in the present specification to describe the workings of the present invention.

Parvin, B. A., "A Structural Classifier for Ship Targets", published July 30, 1984 in the *Proceedings of the 7th International Symposium on Pattern Recognition*, Montreal, Canada, conference sponsored by the International Association of Pattern Recognition and the IEEE, describes one application of the present invention: recognition of a ship target. In this application, the perceived target is segmented using a relaxation based procedure. Structural features of the perceived target are extracted by producing a compact description of the perceived target's boundary. Finally, the structural features are classified by string-to-string matching, wherein one of two symbolic strings is a representation of the perceived target, and the other of said two symbolic strings is a prestored representation of a model target, so that performing the string-to-string matching measures how closely the perceived target resembles the model target.

DEFINITIONS

The following definitions apply throughout the present specification and claims:

1. An alphabet is any set of basic symbols (elements) out of which all other acceptable symbols are built by concatenation. An alphabet set need not be finite or countable, but in practice it is usually finite. Examples of alphabet sets are: [I, am, . . . ], [a,e,d,r ], and the binary symbols [0,1 ], where each set is bounded by the brackets [].

2. A string (or symbolic string) is a finite set of symbols. The terms "sentence" and "word" are often used in the artificial intelligence literature as synonyms for "string". Examples of strings are: [late I am ], [dera ], and the binary string [0111001 ], where each string is bounded by the brackets []. The length of a string is the number of symbols in the string.

3. The distance between two strings is defined as the minimum cost of transforming one string into the other. The cost (risk) of transformation is a measure of the degree of difficulty associated with the transformation, and is a function of the corresponding edit operations required to perform the transformation. An edit operation is a manipulation that performs part of the transformation. If the costs associated with all the individual edit operations are equal, then the distance between the two strings is proportional to the minimum number of edit operations required to transform one string into the other. The distance between strings A and B is denoted by D(A,B), and has the following three properties:

(i) D(A,A)=0;
(ii) D(A,B)=D(B,A); and
(iii) D(A,C)<D(A,B)+D(B,C).

Thus, distance is a measure of the degree of similarity of the two strings.

4. The principle of optimality is a term used in decision theory, and means that any partial solution of an optimum solution to a problem must itself be optimum with respect to an initial and a final state of the partial solution. In the present invention, the problem is represented as an algorithm.

5. One optimization technique that insures the principle of optimality is called dynamic programming, wherein the problem is partitioned into many subproblems, and the solution is formulated as a sequential decision process as follows: (i) decide what the best solution should be based on the partial solutions already made; and (ii) combine all the partial solutions until an optimum solution is reached. Not all optimization problems can use a dynamic programming approach.

6. A systolic array is a computer, which may be embodied as an integrated circuit semiconductor chip, that has three attributes: (i) a cell or computational element can be defined such that the array architecture is a repetition of many identical cells; (ii) the data and control flows of the array are expeditious because cells enjoy local interconnectedness, rather than global interconnectedness, i.e., each cell is connected to adjacent cells only; there is no need for a set of wires that is connected to all the cells; and (iii) a high degree of pipelining and/or multiprocessing advantageously exploits the existence of the many identical cells on the chip. Pipelining means the computer is partitioned into several physical stages, allowing the computation to be overlapped across more than one stage, thus leading to a higher data rate. Multiprocessing means more than one cell is activated at a time.

7. Cyclic loop dependency (CLD) is a property of a class of algorithms in which an inner loop is nested within an outer loop, wherein output values (calculated by the inner loop) depend upon the indices of each of the inner and outer loops and upon at least two previous output values (that have either been calculated or preselected), said two previous output values corresponding to the two indices. The number of nested loops can be more than two. An index of a loop is an integer representing which of the several executions of the loop is occurring. In the example illustrated in the section of this specification entitled "Best Mode for Carrying Out the Invention" (Algorithm I), the outer loop's index is i, where $1 \leq i \leq n$, and the inner loop's index is j, where $1 \leq j \leq m$. A subset of the set of algorithms exhibiting cyclic loop dependency is the set of algorithms employing dynamic programming.

An example of an algorithm exhbiting CLD is given by the following ALGOL programing listing:

```
for i:= 1 to n do
    for j:= 1 to n do
        C(i,j):= A(i−1,j)*C(i−1,j)+
                B(i,j−1)*C(i,j−1)
```

In the above example, A and B are variables, i and j are indices, and C is the output.

DISCLOSURE OF INVENTION

The present invention is a systolic array (1) for shortening the time required to solve an algorithm D(n,m) having CLD. The array (1) comprises several identical cells serially connected, i.e., each cell, except for first and last cells in the chain, is connected to its two adjacent cells. In the preferred embodiment, in which stack loading is employed, each non-end cell is connected only to its two adjacent cells. The cells are accessed sequentially.

The number of cells is equal to the lesser of n and m, where n is the number of times the outer loop is executed and m is the number of times the inner loop is executed. The time required to solve the algorithm D(n,m) is advantageously lowered to be a linear function of n and m.

The algorithm D(n,m) is broken up into nm subalgorithms D(i,j) for all i between 1 and n inclusively and all j between 1 and m inclusively. At each of several processing steps, separate cells perform those subalgorithms D(i,j) for which sufficient information is available to obtain a solution. In the illustrated embodiment, the entire algorithm (Algorithm I) is solved in $n+m-1$ steps by means of diagonally time-slicing a two-dimensional matrix comprised of the nm subalgorithms D(i,j), where the time slices represent the processing steps.

The array (1) can comprise more than one semiconductor chip. If so, the chips are cascadable to preserve a single chain of serially connected cells.

BRIEF DESCRIPTION OF THE DRAWINGS

These and other more detailed and specific objects and features of the present invention are more fully disclosed in the following specification, reference being had to the accompanying drawings, in which:

FIG. 1 is an illustration in conventional format of a typical string matching problem in which string A has four symbols and string B has three symbols;

FIG. 2 is a graphic representation of a dynamic programming algorithm D(n,m) for matching two strings having lengths n and m, respectively;

FIG. 3 illustrates the multiprocessing employed by the present invention for the special case of the FIG. 2 example in which n=m=4;

FIGS. 6 through 9 are a set of related sequential diagrams of an array 1 having m cells, illustrating the operation of array 1 just after initialization, just after step 1, just after step 2, and just after step k, respectively. For FIG. 9, it is assumed that $1 \leq k \leq n < m$.

FIG. 12 is a segmented histogram from the embodiment corresponding to FIGS. 10 and 11; and FIG. 13a, b, c, d and e in combination represent model targets for the embodiment of the invention corresponding to FIGS. 10-12.

BEST MODE FOR CARRYING OUT THE INVENTION

Figure 4:
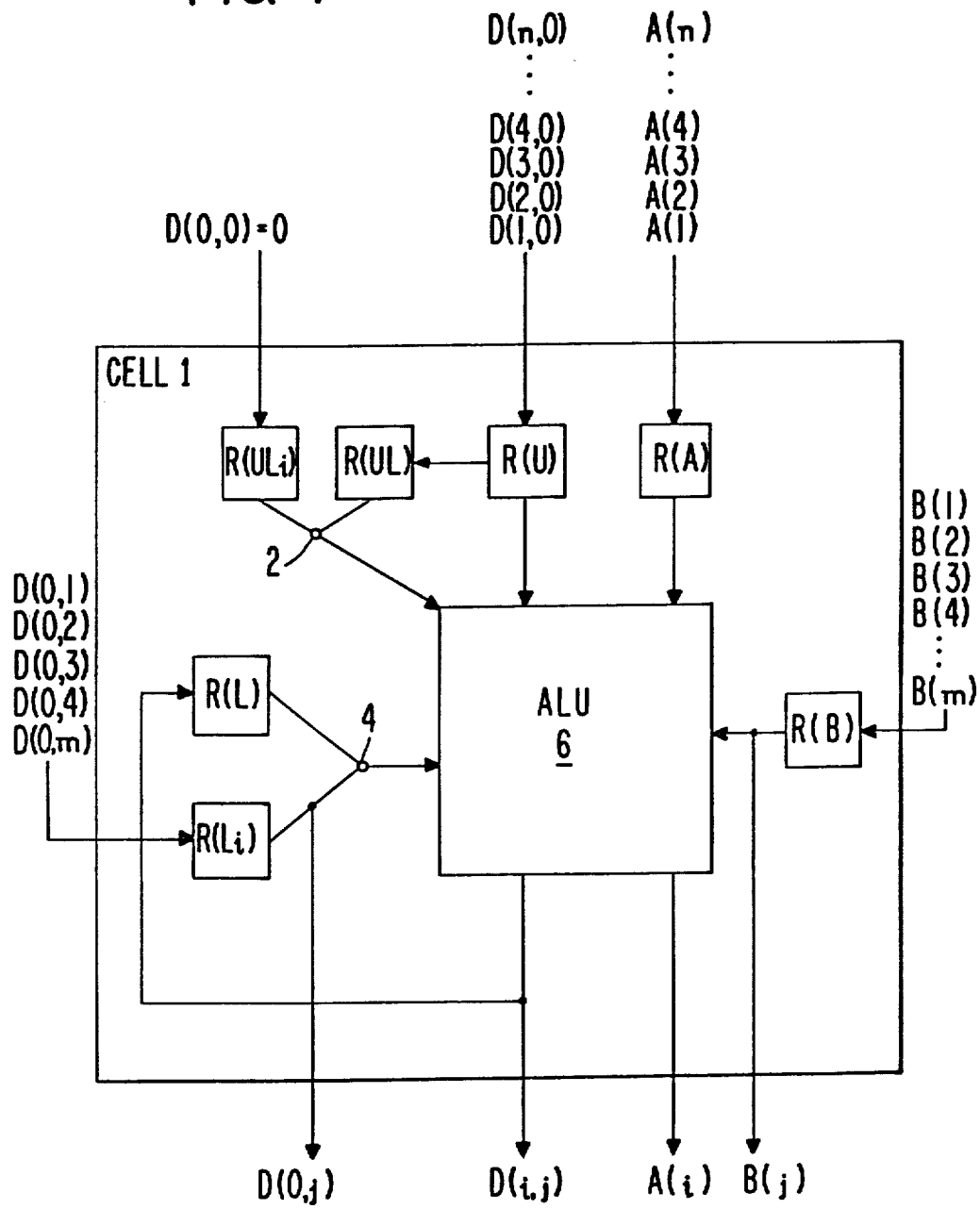
FIG. 4 illustrates the internal layout of any one of the cells of the present invention, plus the loading of five of the registers of cell 1.

A refinement of the string-to-string matching algorithm developed by Wagner and Fischer cited above is used as the vehicle for explaining the operation of systolic array 1 of the present invention. This algorithm determines the distance between two strings, A and B, as measured by the minimum cost sequence needed to transform one string into the other. Three edit operations are defined for use in the algorithm: (1) changing one symbol to another single symbol (substitution operation); (2) deleting one symbol from one string (deletion operation); and (3) inserting one symbol into one string (insertion operation). Two examples are given below, in which the cost of each of the three edit operations has been arbitrarily preselected to be equal to 1.

EXAMPLE 1 string A=abbc
string B=abcc

String A can be transformed to string B via one edit (substitution) operation. Thus, the cost of this transformation is 1. This is the minimum cost, and so the distance between strings A and B is 1.

EXAMPLE 2 string A=abca
string B=acb

At least two edit operations are required to transform string A into string B, e.g.:

(i) delete "b": abca→aca
(ii) substitute "a" by "b": aca→acb

The solution is graphically illustrated in FIG. 1. The minimum cost of a successful transformation is 2, and thus the distance between strings A and B is 2.

As the lengths of the strings being matched increase, the distance determination becomes increasingly complicated. One way to find the distance is by exhaustive search of all possible transformations. The dynamic programming algorithm of Wagner and Fischer provides a systematic solution to the distance determination problem, as seen in the following ALGOL program listing:

Algorithm I

1. D(0,0):=0;
2. for i:=1 to n do D(i,0):=D(i−1,0)+W(D)*-c(A(i)→N);
3. for j:=1 to m do D(0, j):=D(0, j−1)+W(I)*c(N→B(j));
4. for i:=1 to n do
5. for j:=1 to m do begin
6. d(S):=D(i−1,J−1)+W(S)*c(A(i)→B(j));

7. d(D):=D(i−1,j)+W(D)*c(A(i)→N);
8. d(I):=D(i,j−1)+W(I)*c(N→B(j));
9. D(i,j):=min(d(S),d(D),d(I));
10. end;

In the above program listing, A and B are two strings having lengths n and m, respectively; N means "null" and denotes the absence of a symbol; and c is an incremental cost function. A(i) means the ith symbol in A, and B(j) means the jth symbol in B.

The arrow → signifies "becomes"; thus, e.g., A(i)→B(j) means the ith symbol of A becomes the jth symbol of B. D(i,j) is the distance between the first i symbols of string A and the first j symbols of string B. The first three lines of Algorithm I are definitional initializations.

W(S), W(D), and W(I) are arbitrary weights assigned to the substitution, deletion, and insertion operations, respectively. These weights are part of an overall cost function C=Wc. By breaking the overall cost function C into two parts, one can have a part (W or c) that is independent of the location of the symbol being manipulated, and the other part (c or W) dependent thereon. Alternatively or in addition, one part (W or c) can be independent of the identity of the symbol being manipulated, and the other part (c or W) dependent thereon. Thus, for example, suppose the alphabet comprises the common English alphabet, and the strings A,B comprise peoples' last names being matched. One might assume that deletion and insertion errors are, in general, twice as serious as substitution errors. Thus, W(D)=W(I)=2W(S) and is a constant for all symbols. On the other hand, one might assume that deletion of a vowel is twice as serious as deletion of a consonant. Then W(D) is a variable depending upon the letter of the alphabet, and is twice as great for vowels as it is for consonants.

d(S), d(D), and d(I) are the incremental distances attributable to a substitution, a deletion, and an insertion, respectively.

An example of a string-to-string matching problem that can be advantageously solved using the above Algorithm I and the systolic array described herein is the structural classifier for ship targets application briefly described above in the Background Art section. In recent years, numerous advances in IR (infrared) imagery have led to an increasing amount of high resolution data. Coupled with the continued reduction in sensor cost, this has made possible the development of automated techniques for image analysis and target recognition. This section of the specification addresses the recognition of ship targets in IR imagery using structural information. Previous efforts in ship classification exploited the classical approach of statistical pattern recognition. These techniques enjoy the benefit of a well developed theoretical foundation, and have been sucessfully demonstrated. The most important difference between the statistical approach and the instant structural approach is that the statistical approach relies on global features, such as Fourier descriptors, moments, etc.; while the structural approach exploits local features.

The instant method of structural classification consists of three steps: segmentation of the perceived target, extraction of features of the perceived target, and matching the perceived target to a model target.

The first step (segmentation) separates the ship target pixels from the background. With the target pixels thus isolated, all the necessary features can be directly derived from the ship's silhouette.

The second step (extraction) describes the shape of the ship target from a structural perspective, that is, by local feature attributes.

The third step (classification or matching) uses the structural features and their interrelationships for discrimination. In the past, this was usually achieved via grammars, a set hypothesis, or a set of models.

The segmentation step is a relaxation based algorithm. The relaxation approach has several advantages over other segmentation algorithms. The most important is the fact that the labeling decision at any iteration is made dependent on the decision made on the previous iteration. For more details of the relaxation approach, see Bhanu and Parvin, "Segmentation of Natural Scenes", *Pattern Recognition*, Vol. 20, No. 5, pp. 487–496, 1987.

Figure 10A:
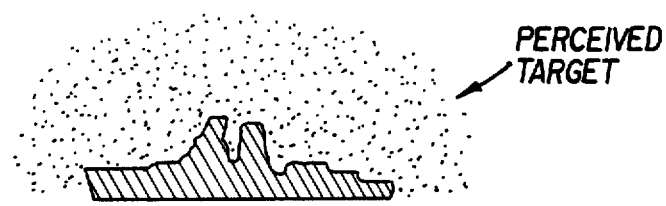
FIG. 10a, b, c and d in combination represent a perceived ship target at various stages during the performance of a string-to-string matching using the present invention.
Figure 11:
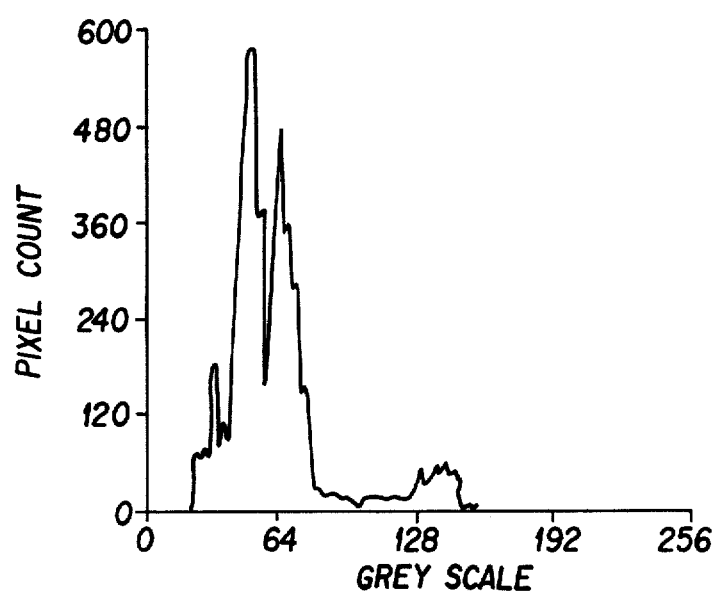
FIG. 11 is a histogram from the embodiment corresponding to FIG. 10.

FIG. 10(a) shows a typical perceived target as detected by infrared sensing means. Note the presence of background noise. FIG. 11 is a raw histogram throughout the field of view, showing, for FIG. 10(a), the number of pixels at various levels of grey scale from 0 to 256, corresponding to total brightness and total darkness, respectively. Most of the large spikes on the left-hand side of the graph correspond to the bright background, and most of the lower spikes on the right correspond to the ship. However, there is no clear threshold between the background and the ship.

The results of the segmentation are seen in FIG. 12, wherein there is a distinct gap between the background data and ship data, and data compression. The segmentation algorithm automatically selects the threshold between the background and the ship. After the segmentation has discarded the background data represented on the left of FIG. 12, the results can be graphically portrayed by FIG. 10(b), which differs from FIG. 10(a) only in that the background noise has been eliminated.

Figure 10B:
Figure 10C:

The structural features extraction step is designed to extract the local feature activities by producing a compact one-dimensional description (string) of the boundary of the perceived and segmented ship. The result is shown in FIG. 10(c). In a sense, the structural features approach shares the same objective as the statistical features approach, since both are data reduction techniques. It is evident from the nature of the problem that the top of the ship boundary is sufficient for classification, i.e., the two-dimensional data representation of FIG. 10(b) is transformed into one dimension by scanning just the top of the silhouette.

Figure 10D:

The compact boundary features are then extracted by utilizing the procedure of polygon fit to the top of the ship. The result is shown in FIG. 10(d), wherein fewer lines are used to describe the ship's boundary than in FIG. 10(c). Generally, the method of polygon fit suffers from the fact that it is not unique, and depends upon the starting point. This problem is resolved by scanning the upper part of the boundary from left to right. Thus, by fixing the start and end points, the problem of random partitioning is brought under control.

The structural classification step was designed with the requirement that it should be able to classify partially occluded targets. From this perspective, four techniques were analyzed and evaluated: stochastic labeling, artificial intelligence, syntactic pattern recognition, and string-to-string matching. The metrics of evaluation were optimality, overhead, and efficient implementation. Based upon these metrics, string-to-string matching was found to be superior.

Following the polygon-fit, the vertices of the polygon (the sharp corners on FIG. 10(d)) are scanned from left to right. For each pair of vertices, a line segment (corresponding to a symbol in the first string) is generated, and for each symbol, two attributes (slope and length) are computed. Next, the string-to-string matching Algorithm I described above is invoked to compute the distance between the slope and length substrings of the perceived target and each of a set of model targets independently. In other words, two distance measures are computed; one is due to the cost of slope transformation, and the other is due to the cost of length transformation.

A perceived target is assigned to that model target from the set of model targets that minimizes the product of the cost of slope transformation and the cost of length transformation. Each model target can be a drawing of a ship from a textbook, a single ship sample from an historical data base of perceived targets, or a synthetic ship target interactively developed on a graphic system.

To evaluate the structural classifier, one hundred actual images of perceived targets corresponding to five classes of model targets were selected (20 samples from each class). The five classes were cargo ship, container ship, landing assault tanker, frigate, and destroyer. These five classes of model targets are illustrated in FIG. 13.

The sample perceived targets had similar range from the sensor platform. Each testing sample was matched to all five classes of model targets, and the corresponding distance of slope and length transformation was obtained for each class. A sample was assigned to that class which minimized the product of the slope and length transformation. The classification results indicated nearly perfect recognition for all the testing samples.

By inspecting steps 4 and 5 of the above Algorithm I program listing, one can see that the time needed to perform Algorithm I is proportional to the product of the lengths of the strings, i.e., proportional to nm, if conventional programming techniques are employed.

The primary contribution of the instant systolic array 1 is the reduction in the time needed to perform the algorithm to be a linear function of n and m. In the case of Algorithm I, the solution time is proportional to n+m−1. This is accomplished by using a number of cells that is equal merely to the lesser of n and m. As FIGS. 4 and 5 indicate, local interconnectedness, pipelining, and multiprocessing are used.

Assume two strings A,B of lengths n,m, respectively, are to be matched. FIG. 2 shows all the subalgorithms D(i,j) that have to be solved. The same notation D(i,j) is used herein for an arbitrary subalgorithm and for the distance calculated by the subalgorithm. The circled numbers indicate the order in which the subalgorithms D(i,j) would be solved by a conventional computer.

FIG. 2 illustrates an array 1 architecture in which each jth cell performs all the D(i,j) subalgorithms for all i. Alternatively, the coordinates within the array 1 architecture can be reversed (keeping each cell executing all the subalgorithms on a given row), so that each ith cell performs all the D(i,j) subalgorithms for all j.

The general technique of the present invention is to solve the algorithm D(n,m) in several processing steps; for each step, those subalgorithms D(i,j) are solved for which sufficient information exists to solve the subalgorithm D(i,j). A separate cell is assigned to the execution of each subalgorithm D(i,j), to take advantage of the time savings inherent in multiprocessing. For the illustrated example, each subalgorithm D(i,j) is constrained to the solution of three other subalgorithms: those located directly to the above, left, and above-left of the current subalgorithm, corresponding to lines 8, 6, and 7 of Algorithm I, respectively. Thus, if the subalgorithm labeled with the circled 1 is solved at time t1 (step 1), the subalgorithms labeled with the circled 2 and 5 can be solved simultaneously at time t2 (step 2), the subalgorithms labeled with the circled 3, 6, and 9 can be solved simultaneously at time t3 (step 3), etc. FIG. 3 summarizes where (the cell number) and when (the time cycle) each subalgorithm D(i,j) is solved, assuming n=m=4.

The operation of the invention can be visualized by drawing a set of diagonal lines intersecting the horizontal and vertical lines of FIG. 2. Each diagonal line corresponds to a single step. Subalgorithms D(i,j) to the northwest of each diagonal line have been solved, and therefore sufficient information exists to solve the subalgorithms D(i,j) intersected by the diagonal line.

FIG. 3 illustrates that the entire problem is solved in seven steps (n+m−1). If the above-listed algorithm D(n,m) were implemented by conventional software or hardware approaches, on the other hand, the number of steps would be sixteen (nm).

It is assumed that steps 1, 2, and 3 of Algorithm I are computed before time t1, and the results are inputted to array 1.

Figure 5:
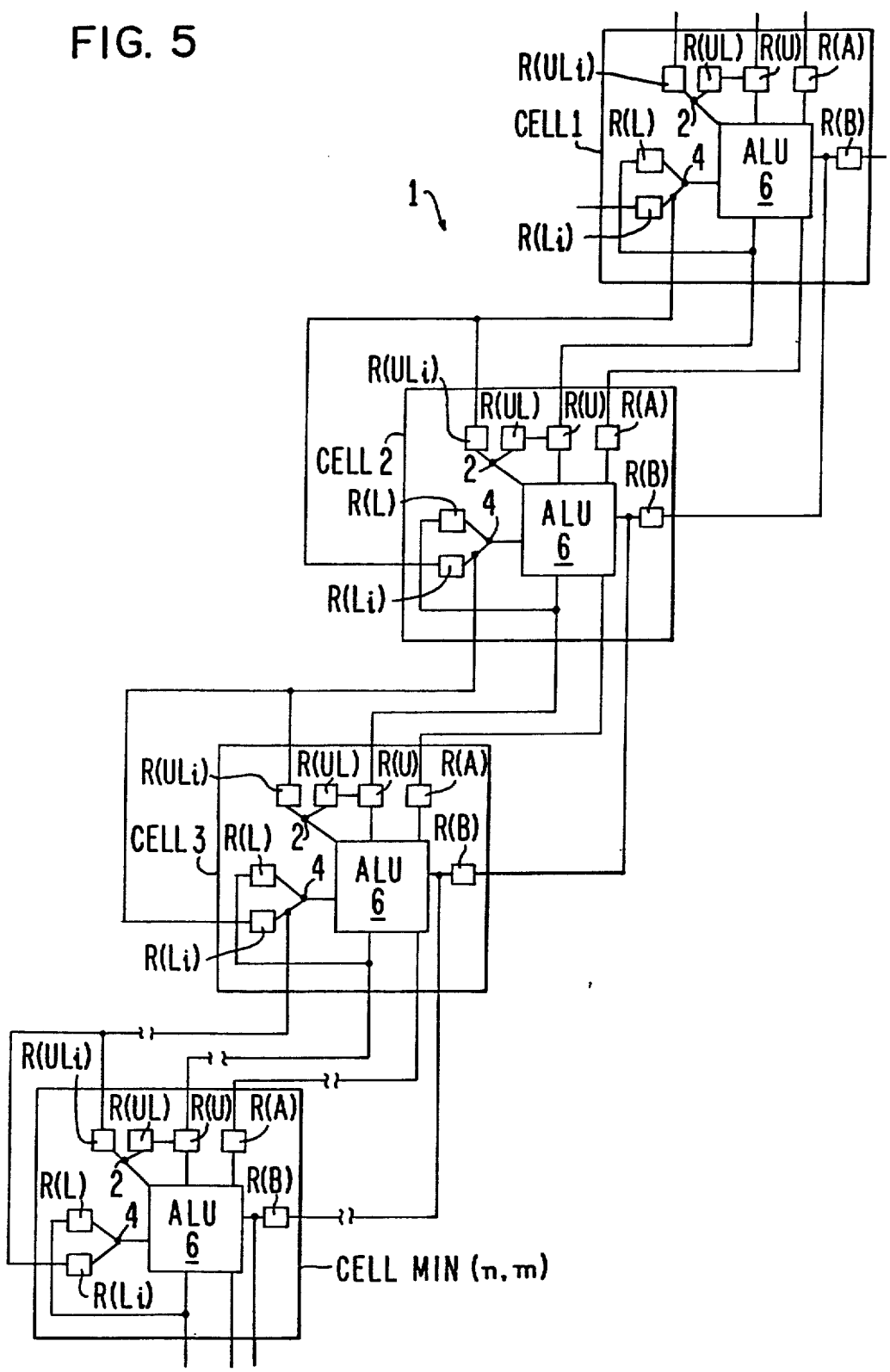
FIG. 5 is a diagram showing the cell interconnectedness of array 1.

The following notation is used in describing the structure of each cell (FIGS. 4 and 5). R(L) is a register containing the result of the subalgorithm D(i,j) to the left (with respect to FIG. 2) of the current subalgorithm; R(U) is a register containing the result of the upper subalgorithm, i.e., the subalgorithm above (with respect to FIG. 2) the current subalgorithm; R(UL) is a register containing the result of the upper left subalgorithm, i.e., the subalgorithm diagonally northwest of the current subalgorithm with respect to FIG. 2; and the prefix "i" refers to a register which is accessed only when a cell is invoked initially. For example, the arithmetic logic unit (ALU) 6 of each cell reads left subalgorithm data either from R(L) or from R(Li). If the cell is executing for the first time, it will read data from R(Li); otherwise, it will read data form R(L).

The array 1 is initialized by loading the R(Li) and R(B) registers in each cell with appropriate starting values; and by loading R(ULi), R(U), and R(A) of cell 1 with other starting values.

FIG. 4 illustrates the interior layout of any one of the cells. All cells of array 1 are identical. This fungibility is a great advantage of the present invention because it facilitates the manufacture of a large number of identical cells on a single chip using techniques of large scale integration or very large scale integration. The FIG. 4 cell is labeled as cell 1 because cell 1, the first cell in the interconnected chain of cells, is the only one that is loaded in the preferred embodiment. This structure is another advantage of the present invention, because it eliminates a potentially very large number of input lines to the various cells.

Arithmetic logic unit 6 is a small processor which performs the necessary calculations; it typically comprises a ROM and a RAM. The ROM comprises a short program and a lookup table. The program instructs ALU 6 as to the steps needed to be performed during each processing step. In the example illustrated, the ROM program embodies steps 6 through 9 of Algorithm I. The ROM's lookup table contains prestored values needed for executing this program. Here, the weights W and incremental costs c of Algorithm I are prestored in the lookup table. The ROM can be made reprogrammable, as is well known to practitioners of the semiconductor fabrication arts, so that the same cell can be reprogrammed to process a different application subsequently.

The last line of code in the ROM program can be an instruction commanding switch 2 to bring ALU 6 its subsequent upper-left inputs from R(UL) rather than from R(ULi), and commanding switch 4 to bring ALU 6 its subsequent left inputs from R(L) rather than from R(Li). The result of this last instruction is that registers R(ULi) and R(Li) are invoked only the first time that the cell performs a processing step. During subsequent steps, registers R(UL) and R(L), respectively, are used.

In the preferred embodiment, registers R(Li) and R(B) of each of the cells in array 1 are preloaded. This is illustrated in FIG. 4 using conventional stack loading notation, i.e., at a first initialization time, as clocked by a synchronous system clock which synchronously clocks all the cells in the array 1, R(Li) of cell 1 is loaded with D(0,m) and R(B) of cell 1 is loaded with B(m). At a second initialization time, the contents of cell 1's R(Li) are passsed to cell 2's R(Li); the contents of cell 1's R(B) are passed to cell 2's R(B); D(0,m-1) is fed into cell 1's R(Li); and B(m-1) is fed into cell 1's R(B). This process continues until the R(Li)'s and the R(B)'s of all of the first m cells are filled.

Also as part of the initialization process, cell 1's R(ULi) is fed with D(0,0), which equals 0 (line 1 of Algorithm I). The loading of R(U) and R(A) of cell 1, while stack loading as with R(Li) and R(B), is different from the previously described stack loadings, because R(U) and R(A) are loaded sequentially just prior to the execution of each processing step. Thus, during initialization, D(1,0) is fed into cell 1's R(U), and A(1) is fed into cell 1's R(A). This is all the initialization that is performed.

Now the execution begins, by control being passed to cell 1's ROM program, which executes subalgorithm D(1,1) during time t1 (step 1). The calculated distance D(1,1) is passed to R(U) of cell 2 and to R(L) of cell 1. A(1) is passed through to R(A) of cell 2. A(2) is fed into R(A) of cell 1. And D(1,0) from R(U) of cell 1 is passed to R(UL) of cell 1, followed by D(2,0) being fed to R(U) of cell 1.

In general, D(i,j) is passed to R(U) of the next cell and to R(L) of the same cell; A(i) is passed to R(A) of the next cell; R(A) of the current cell is fed with A(i+1); and the contents (D(i,0) of R(U) of the current cell are passed to R(UL) of the current cell, followed by R(U) of the current cell being fed with D(i+1,0).

This processing continues, step by step, until all of the D(i,0) and A(i) have been fed into cell 1 and processed. Then, for subsequent processing steps, cell 1 is no longer utilized, as can be seen from FIG. 3.

FIG. 5 shows the cell interconnectedness. Multiple cells can be cascaded together by means of connecting the last cell on one integrated circuit chip with a first cell on another integrated circuit chip. by this method of cascading, array 1 can be made into an arbitrarily long chain of cells despite any limitations on the maximum number of cells per chip. FIG. 5 shows each cell as having four inputs and four outputs. Alternatively, each cell can have but a single input bus and a single output bus, by using techniques of time multiplexing. This can be accomplished by programming the ROM of each ALU 6 to load the registers of the associated cell from the registers of the previous cell.

FIGS. 6 through 9 illustrate, assuming that there are m cells, the status of array 1 just prior to commencement of algorithm execution (i.e., after completion of initialization (t0), just after t1, just after t2, and just after tk, respectively, where $1 \leq k \leq n \leq m$. After all $m+n-1$ steps have been performed, the D(i,j) output of the mth cell is the distance D(n,m) as desired.

Applications of array 1 include all problems that require string matching or correction. For example, consider the problem of latent fingerprint recognition, i.e., the identification of a fingerprint taken at the scene of a crime. This kind of fingerprint is incomplete (deletion error), and may be distorted due to smudging (insertion and substitution errors). There are two types of information in a roll of fingerprint: ridge direction data and minutia data. The ridge direction data comprises prototype patterns, establishing a pair of reference coordinates. The latent fingerprint is registered in this reference frame. On the average, each roll of fingerprint contains 80 minutia data. Each minutia datum comprises three fields of information; location, direction, and whether it ends or bifurcates. By superimposing an address grid on the registered roll of fingerprint, and scanning the registered roll from left to right and from top to bottom, the two-dimensional matrix data is reduced into a one-dimensional string with three-dimensional symbols (corresponding to the three fields of information), thus allowing string matching as a tool for discriminant analysis.

Another example of a string-to-string application is a target identification application, such as the one cited in the Background Art section.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for determining whether a perceived target is acceptably close to a model target, said method comprising the steps of:
   segmenting the perceived target using a relaxation based procedure;
   extracting structural features from the perceived target by producing a compact one-dimensional description of the perceived target's boundary; and
   classifying said structural features by using string-to-string matching, wherein one of two symbolic strings is a representation of the compact one-dimensional description of the boundary of the perceived target, and the other of said two symbolic strings is a prestored representation of the model target, and the string-to-string matching entails measuring the distance between the two strings based upon deletion, insertion, and substitution of symbols from one string to the other; so that:
   performing the string-to-string matching measures how closely local structural features of the perceived target resemble local structural features of the model target.

2. The method of claim 1 wherein the perceived target is a ship and the compact one-dimensional description of the perceived target's boundary covers just upper portions of the ship's profile.

3. The method of claim 1 wherein the distance measurement entails solving an algorithm having cyclic loop dependency, in which two nested loops are executed n and m times, respectively, where n and m are the number of elements in the two symbolic strings, respectively; and the algorithm is solved in $n+m-1$ steps by a systolic array comprising many identical cells serially connected to form a chain, so that each cell, except for first and last cells in the chain, is connected only to its two adjacent cells, while the first and last cells in the chain are connected only to their sole adjacent cells; wherein:

at certain moments during said algorithm solving, more than one cell is activated to perform a part of said solving so that the total time required to solve the algorithm is a linear function of the numbers of times the loops are executed.

* * * * *